(12) United States Patent  
Riepertinger

(10) Patent No.: US 9,012,831 B2  
(45) Date of Patent: Apr. 21, 2015

(54) ROTARY ENCODER

(71) Applicant: Dr. Johannes Heidenhain GmbH, Traunreut (DE)

(72) Inventor: Sebastian Riepertinger, Soechtenau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 177 days.

(21) Appl. No.: 13/774,184

(22) Filed: Feb. 22, 2013

(65) Prior Publication Data

US 2013/0214140 A1     Aug. 22, 2013

(30) Foreign Application Priority Data

Feb. 22, 2012   (DE) .................. 10 2012 202 683

(51) Int. Cl.
  *G01D 5/34* (2006.01)
  *G01D 5/347* (2006.01)
  *G01D 11/24* (2006.01)

(52) U.S. Cl.
  CPC ............ *G01D 5/3473* (2013.01); *G01D 11/245* (2013.01)

(58) Field of Classification Search
  CPC ............................ G01D 11/245; G01D 5/3473

USPC ........................................ 250/231.13–231.18
  See application file for complete search history.

(56) References Cited

U.S. PATENT DOCUMENTS

| 6,107,621 A * | 8/2000 | Imai et al. ................ 250/231.13 |
| 6,775,898 B1 | 8/2004 | Schroter et al. |
| 2002/0145108 A1* | 10/2002 | Rodi ........................ 250/231.14 |

FOREIGN PATENT DOCUMENTS

EP           1 102 964          5/2001

\* cited by examiner

*Primary Examiner* — Thanh Luu  
(74) *Attorney, Agent, or Firm* — Kenyon & Kenyon LLP

(57) ABSTRACT

A rotary encoder includes a housing and a shaft, which has an axis. A graduated disk is fixed in place on the shaft in torsionally fixed manner. The shaft is adapted for the positionally accurate attachment to a first machine part. Furthermore, a scanning device for scanning the graduated disk is fixed in place on the housing, the housing being arranged such that an outer surface forms a positionally accurate rigid stop on a second machine part in the radial direction. The housing includes a housing body and a cover, the housing body and the cover being connected to each other by press-fitting. The housing has a mechanically flexible element which is deformed as a result of the press-fitting.

9 Claims, 2 Drawing Sheets

2

ROTARY ENCODER

CROSS-REFERENCE TO RELATED APPLICATIONS

The present application claims priority to Application No. 10 2012 202 683.5, filed in the Federal Republic of Germany on Feb. 22, 2012, which is expressly incorporated herein in its entirety by reference thereto.

FIELD OF THE INVENTION

The present invention relates to a rotary encoder having a housing.

BACKGROUND INFORMATION

Rotary encoders are used to measure rotary motions of a rotationally mounted element, especially a shaft, over one or more revolutions. In so doing, the rotary motion is recorded incrementally or absolutely. In conjunction with gear racks and gear wheels or with threaded spindles, a rotary encoder is also able to measure linear motions.

Rotary encoders are used in large numbers as so-called engine feedback devices and when used as such, form positional or angular information which is utilized for the commutation of electric drives. For example, in the case of synchronous motors, information about the absolute rotor position is required immediately after switching on the supply voltage. The rotary encoders with additional commutation signals, which supply relatively rough positional information, and the absolute rotary encoders in single-turn and multi-turn designs, which immediately output the exact angular position with an accuracy of a few angular seconds, are suitable for this purpose.

Such rotary encoders are often manufactured and installed in large quantities. Therefore, it is even more important that these devices can be produced in economical manner and are easy to assemble, e.g., on electric motors.

A rotary encoder which is able to be fixed in place by clamping in a hollow-cylindrical recess of an electric motor is described in European Patent No. 1 102 964.

SUMMARY

Example embodiments of the present invention provide a rotary encoder of the type mentioned above, which may be simply produced and attached and which is able to achieve relatively high measuring accuracy.

According to example embodiments of the present invention, a rotary encoder includes a housing and a shaft, which has a (longitudinal) axis. Fixed in place on this shaft, in torsionally fixed manner, is a graduated disk. The shaft is adapted to be attached in positionally accurate manner on a first machine component, this being achieved by very precisely manufactured stop faces, for example. In addition, a scanning unit for scanning the graduated disk is fixed in place on the housing. The housing is configured such that an outer surface or stop face forms a rigid stop face in relation to a second machine component, which stop face is arranged with positional accuracy in the radial direction. Moreover, the housing includes a housing body and a cover, the housing body and the cover being connected to each other by press-fitting, and the housing having a mechanically flexible element which is deformed as a result of the press-fitting.

The graduated disk may be provided with incremental or absolute coding, and the scanning may be based on an inductive measuring principle, for example.

The press-fitting may be provided by a relative movement of the cover toward the housing body in a direction parallel to the axis. Therefore, the press-fit in this case may be provided according to a longitudinal press-fit joint, so that the cover is pressed into the housing body using axial force. The cover may be pressed against a step in the housing body in order to restrict the axial movement at the end of the joining operation.

The flexible element may be formed in one piece on the housing body. As a result, the flexible element may be an integral part of the one-piece housing body. For example, the element is able to be worked out of the wall of the housing body in a machining operation. The flexible element then is made of the same material as the housing body. An aluminum alloy may be selected as material in this context.

The housing may have a plurality of elements located at an offset in the circumferential direction.

The element may include a peripheral flange in the circumferential direction. The flange may feature interruptions, so that a flange having multiple interruptions or multiple flanges is provided.

The element may be deformed in the axial direction and/or in the radial direction because of the press-fitting. The element may be plastically deformed due to the press-fitting, for example.

The rotary encoder may be arranged without a bearing. This means that no rolling bearing or friction bearing which could carry out the function of a mechanical support for the relative rotation of the shaft in relation to the housing, is provided in the rotary encoder itself. Instead, a fixation of the radial and axial relative position between housing and shaft is achieved by the positionally accurate attachment of the shaft on the first machine component and the positionally accurate attachment of the housing on the second machine part. The first and the second machine parts are arranged to allow them to rotate relative to each other.

As a result, the rotary encoder may be configured such that the shaft is able to be rigidly fixed in place on the first machine part, and the housing of the rotary encoder is able to be rigidly fixed in place on the on the second machine part. In other words, a compensating coupling which normally is used to connect either the shaft or the housing to the first or second machine component in axially and radially elastic but torsionally stiff manner, is dispensed with. The particular rotary encoder may therefore be installed without coupling.

The shaft may include a conical surface for the positionally accurate attachment on a first machine part.

Further features and aspects of example embodiments of the present invention are described in more detail below with reference to the appended Figures.

DETAILED DESCRIPTION

Figure 1:
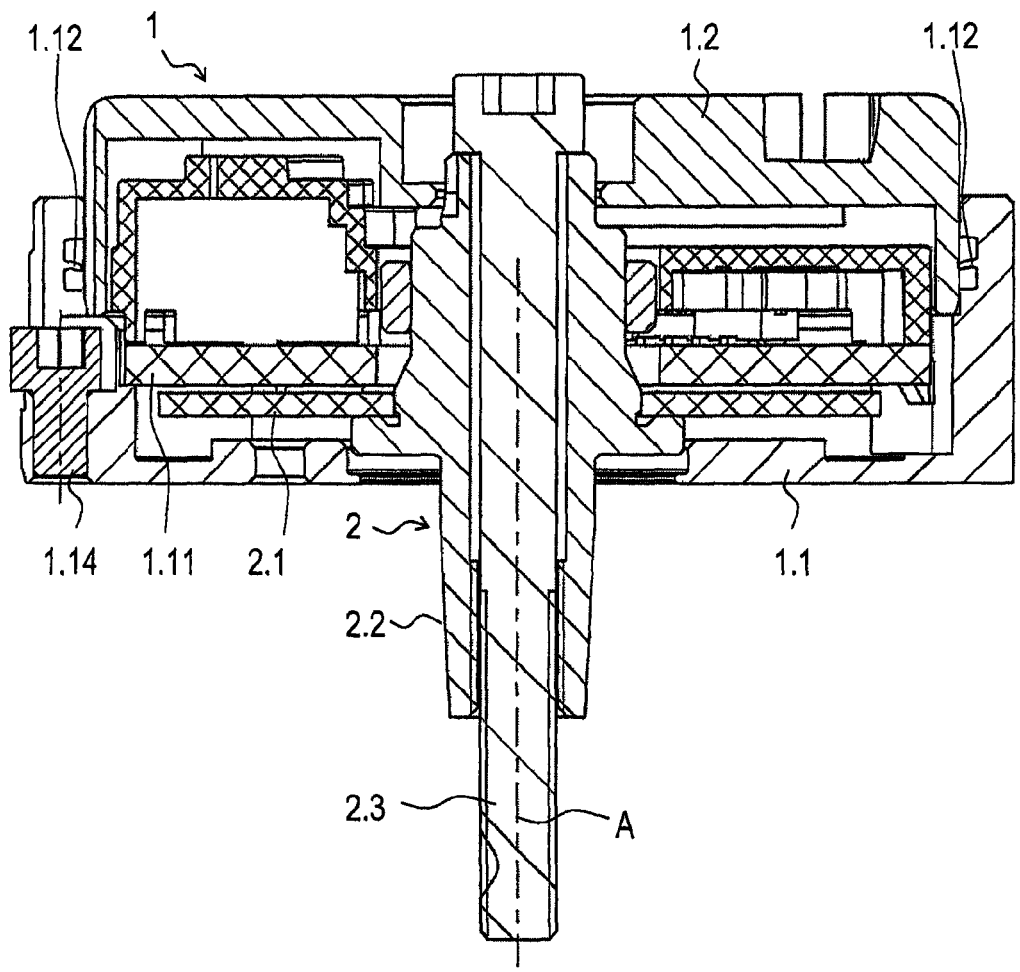
FIG. 1 is a cross-sectional view of a rotary encoder.

As illustrated in FIG. 1, a rotary encoder includes a housing 1 and a shaft 2, which has a longitudinal axis, i.e., axis A.

Figure 3:
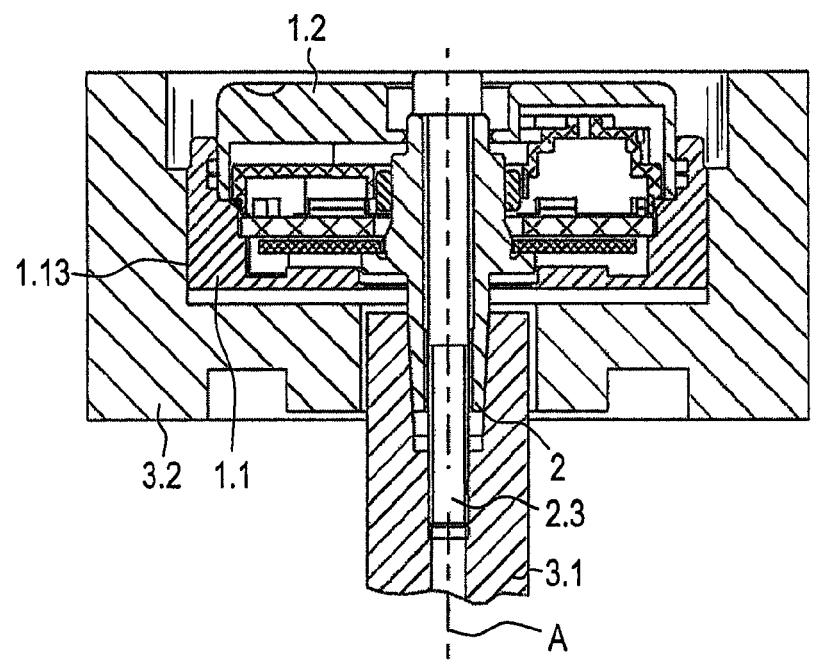
FIG. 3 is a cross-sectional view of the rotary encoder mounted on a machine.
Figure 4:
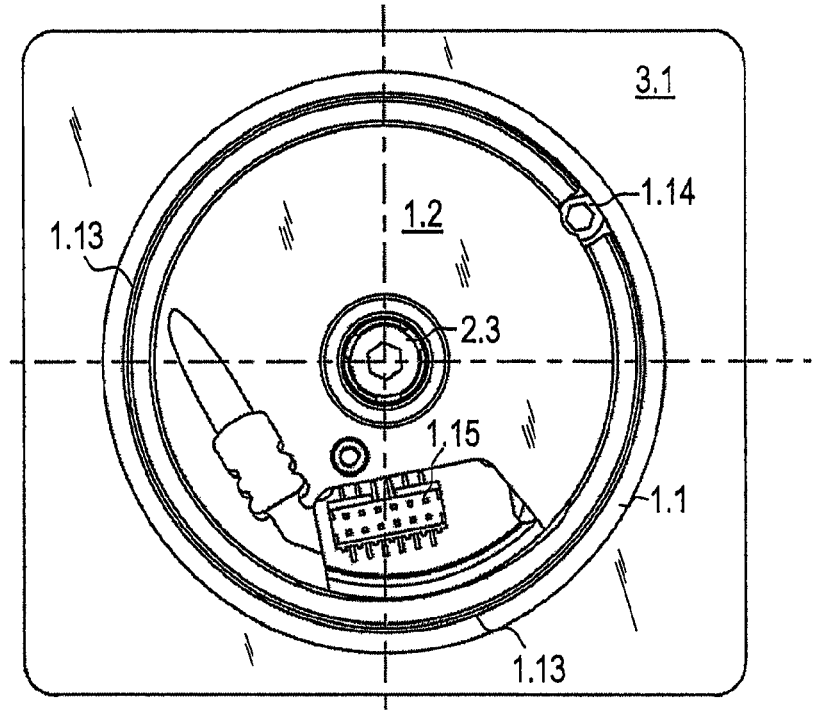
FIG. 4 is a plan view of the rotary encoder mounted on a machine.

Housing 1 has a relatively solid and rigid housing body 1.1, which in the first approximation has a cylindrical outer contour in relation to axis A and may be fabricated from an aluminum material. An eccentrically rotatable clamping bolt 1.14 is provided on housing body 1.1. In addition, housing body 1.1 has a precisely produced outer surface 1.13 (see FIGS. 3 and 4) in a region that has a relatively thick-walled cross-section. For example, in the illustrated exemplary embodiment, the particular outer surface 1.13 may deviate from the indicated outer measurement (e.g., 64.97 mm) only by less than 0.03 mm and more than 0.02 mm. Moreover, a scanning device 1.11 is fixed in place on the inside of housing body 1.1. In the exemplary embodiment illustrated, the rotary encoder is based on an inductive measuring principle. Scanning device 1.11 thus is implemented as a circuit board including transmitter and receiver circuit traces. In addition, electronic components for operating the transmitter circuit traces and for signal processing are mounted on the circuit board. Furthermore, a plug connector 1.15 is mounted on the circuit board in order to produce a plug connection to a cable used as power supply of the rotary encoder and for a signal transmission to a sequential electronics system.

Figure 2A:
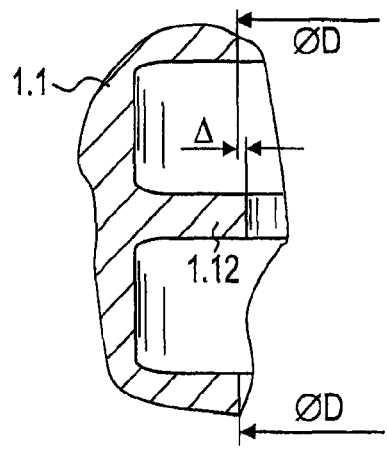
FIG. 2a is an enlarged view of the housing of the rotary encoder prior to press-fitting.

Housing body 1.1 has a substantially hollow cylindrical contour on the inside, especially in the direction of its opening. Two circumferential grooves are machined into this inner surface, so that a circumferential thin flange 1.12 results. As described below, flange 1.12 is used as a flexible element. The inner surfaces on both sides of the grooves are then machined until a diameter ØD results in this region on the inside. The inner surface of flange 1.12 projects into the substantially hollow-cylindrical space of housing body 1.1, by projection Δ (see FIG. 2*a*).

In addition, the rotary encoder includes shaft 2, which is inserted in centered manner in housing body 1.1 and on which a graduated disk 2.1 is fixed in place in torsionally fixed manner. It includes a substrate, which may be made of epoxy resin and on which two scale-division tracks are situated. Graduated disk 2.1 is rotatable about axis A when the rotary encoder is operating as intended, and is scanned inductively by scanning device 1.11 in the example illustrated. The scale-division tracks have a circular shape and are situated with different diameters on the substrate in concentric manner in relation to axis A. The two scale-division tracks include a periodic sequence of alternating electrically conductive scale-division regions and non-conductive scale-division regions. In the example illustrated, copper is applied on the substrate as material for the electrically conductive scale-division regions. In the non-conductive scale-division regions, in contrast, the substrate is left uncoated.

Shaft 2 has a precisely manufactured outer surface 2.2. In the exemplary embodiment illustrated, outer surface 2.2 has a conical configuration. Shaft 2 is not supported on housing 1, which means that a bearingless rotary encoder is provided.

Housing 1 includes a cover 1.2 as additional component. In the exemplary embodiment illustrated, it is provided in the form of a cap and is able to be inserted into the interior of housing body 1.1.

Cover 1.2 has a substantially cylindrical outer surface, so that the circumferential outer surface could be seen as a lateral surface of a cylinder. The maximum outer diameter of the outer surface is smaller than or equal to the above-described inner diameter ØD of housing body 1.1 in the particular insertion region. Accordingly, when cover 1.2 and housing body 1.1 are joined, cover 1.2 is initially inserted substantially without force, until the outer surface of cover 1.2 reaches flange 1.12 in an axial advancing movement, which flange projects into housing body 1.1 via radial projection Δ.

Figure 2B:
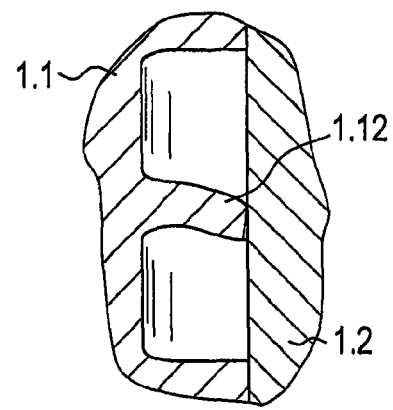
FIG. 2b is an enlarged view of the housing of the rotary encoder following press-fitting.

When cover 1.2 is moved farther in the axial direction relative to housing body 1.1, flexible circumferential flange 1.12 is deformed, until cover 1.2 finally arrives at a step of housing body 1.1 and flange 1.12 is plastically deformed as illustrated in FIG. 2*b*. In other words, press-fitting, e.g., a longitudinal press-fit joint, is used to join cover 1.2 and housing body 1.1.

To center housing 1, outer surface 1.13 forms a rigid stop on a second machine part 3.2, which stop is positionally accurate in the radial direction. In the particular cross-section (e.g., a plane which is orthogonally pierced by axis A) in which the rigid stop is formed, the wall thickness of housing body 1.1 is greater than in the particular cross-section in which elastic element 1.12 is situated. Because of the flexibility of flange 1.12, no change in the outer dimensions in the region of outer surfaces 1.13 of housing body 1.1 is detectable, although accuracies in the range of ¹⁄₁₀₀ mm are required there.

Because housing 1 is closed as a result of the press-fitting, the components of the rotary encoder located on the inside, especially scanning device 1.11 and graduated disk 2.1, are protected from external influences.

In the exemplary embodiment illustrated, the rotary encoder is used to generate commutation signals for an electric motor on which the rotary encoder is able to be clamped. According to FIG. 3, the electric motor has a motor shaft as first machine part 3.1, and a stator housing as second machine part 3.2. That is to say, first machine part 3.1 is situated so as to be rotatable in relation to second machine part 3.2. First machine part 3.1 implemented as motor shaft has an inner thread and a conical bore hole. Second machine part 3.2 has a hollow-cylindrical recess. Both this recess and the conical bore hole must be produced with the utmost precision.

When attaching the bearingless rotary encoder on a machine, i.e., an electric motor, for instance, shaft 2 is first fixed in place on first machine part 3.1 (motor shaft) in rotatably fixed and positionally precise manner with the aid of a central screw 2.3. Then, eccentric clamping bolt 1.14 is operated, so that outer surfaces 1.13 of housing 1 are driven towards the wall of the recess in the second machine part (stator housing). Because of the exceedingly low tolerances, hardly any displacements are noticeable. Housing 1, and therefore scanning unit 1.11 as well, consequently are attached to second machine part 3.2 in positionally accurate manner. It should also be noted that the rotary encoder has no compensating coupling, which is frequently used for the elastic compensation of an offset between shaft 2 and first machine part 3.1. Here, such a compensating coupling may be dispensed with.

In order to produce an electrical connection between the rotary encoder and a subsequent electronic system, the cable may be inserted, without tension, into a correspondingly formed depression (see FIG. 4) of cover 1.2 and the cable end be joined to plug connector 1.15.

What is claimed is:

1. A rotary encoder, comprising:
   a housing;
   a shaft having an axis and positionally accurately attachable on a first machine part;
   a graduated disk mounted on the shaft in a torsionally fixed manner; and
   a scanning device, adapted to scan the graduated disk, fixed in place on the housing;
   wherein an outer surface of the housing forms a rigid stop face that is positionally accurate in a radial direction, in relation to a second machine part;
   wherein the housing includes a housing body and a cover, the housing body and the cover connected to each other by a press-fit connection, the housing including a mechanically flexible element deformed by the press-fit connection; and wherein the element is integrally formed on the housing body.

2. The rotary encoder according to claim 1, wherein the press-fit connection is formed by a relative movement of the cover towards the housing body in a direction parallel to the axis.

3. The rotary encoder according to claim 1, wherein the element is plastically deformed by the press-fit connection.

4. The rotary encoder according to claim 1, wherein the rotary encoder is bearingless.

5. The rotary encoder according to claim 1, wherein the shaft is rigidly fixable in place on the first machine part.

6. A rotary encoder, comprising:
a housing;
a shaft having an axis and positionally accurately attachable on a first machine part;
a graduated disk mounted on the shaft in a torsionally fixed manner; and
a scanning device, adapted to scan the graduated disk, fixed in place on the housing;
wherein an outer surface of the housing forms a rigid stop face that is positionally accurate in a radial direction, in relation to a second machine part;
wherein the housing includes a housing body and a cover, the housing body and the cover connected to each other by a press-fit connection, the housing including a mechanically flexible element deformed by the press-fit connection; and
wherein the element includes a flange extending along a periphery in a circumferential direction.

7. A rotary encoder, comprising:
a housing;
a shaft having an axis and positionally accurately attachable on a first machine part;
a graduated disk mounted on the shaft in a torsionally fixed manner; and
a scanning device, adapted to scan the graduated disk, fixed in place on the housing;
wherein an outer surface of the housing forms a rigid stop face that is positionally accurate in a radial direction, in relation to a second machine part;
wherein the housing includes a housing body and a cover, the housing body and the cover connected to each other by a press-fit connection, the housing including a mechanically flexible element deformed by the press-fit connection; and
wherein the housing includes a plurality of mechanically flexible elements located at an offset in a circumferential direction.

8. A rotary encoder, comprising:
a housing;
a shaft having an axis and positionally accurately attachable on a first machine part;
a graduated disk mounted on the shaft in a torsionally fixed manner; and
a scanning device, adapted to scan the graduated disk, fixed in place on the housing;
wherein an outer surface of the housing forms a rigid stop face that is positionally accurate in a radial direction, in relation to a second machine part;
wherein the housing includes a housing body and a cover, the housing body and the cover connected to each other by a press-fit connection, the housing including a mechanically flexible element deformed by the press-fit connection; and
wherein the element is deformed in an axial direction by the press-fit connection.

9. A rotary encoder, comprising:
a housing;
a shaft having an axis and positionally accurately attachable on a first machine part;
a graduated disk mounted on the shaft in a torsionally fixed manner; and
a scanning device, adapted to scan the graduated disk, fixed in place on the housing;
wherein an outer surface of the housing forms a rigid stop face that is positionally accurate in a radial direction, in relation to a second machine part;
wherein the housing includes a housing body and a cover, the housing body and the cover connected to each other by a press-fit connection, the housing including a mechanically flexible element deformed by the press-fit connection; and
wherein the shaft includes a conical area for positionally accurate attachment to the first machine part.

* * * * *